(No Model.)

C. S. ROGERS.
FLOUR SAFE.

No. 423,955. Patented Mar. 25, 1890.

Witnesses:
R. A. Balderson
F. G. Fischer

Inventor:
C. S. Rogers
By His Attorneys,
Higdon & Higdon

UNITED STATES PATENT OFFICE.

CHARLES S. ROGERS, OF FORT RENO, INDIAN TERRITORY.

FLOUR-SAFE.

SPECIFICATION forming part of Letters Patent No. 423,955, dated March 25, 1890.

Application filed November 6, 1889. Serial No. 329,408. (No model.)

*To all whom it may concern:*

Be it known that I, CHARLES S. ROGERS, of Fort Reno, Indian Territory, have invented certain new and useful Improvements in Flour-Safes, of which the following is a full, clear, and exact description, reference being had to the accompanying drawings, forming a part hereof.

My invention relates to an improved flour safe and sieve combined wherein may be stored more especially flour for house or domestic use, while it is adapted to permit sifting the flour or its contents out in quantities as desired for use or conversion into dough, said invention also being adapted to conveniently hold the usual ingredients for bread-making, as salt, yeast, &c., and the bread-pan, kneading-board, &c.

The invention consists of the novel combination and construction of parts, as will appear from the following description and accompanying illustration, in which—

Figure 1:
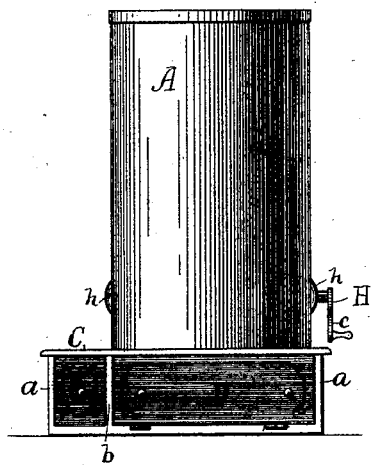
Figure 2:
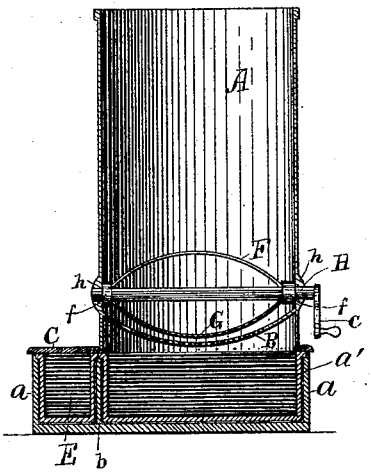
Figure 3:
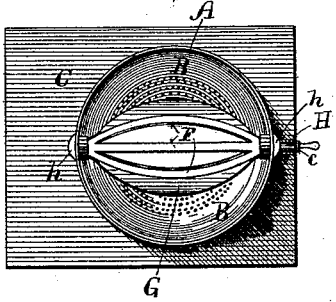
Figure 4:
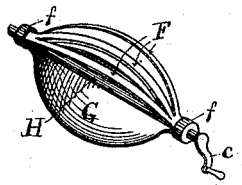
Figure 5:
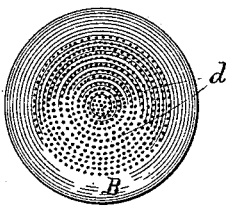

Figure 1 is a side elevation of my improved flour safe and sieve combined. Fig. 2 is a sectional elevation of the same. Fig. 3 is a plan view thereof, the concave plate, however, carried by the agitator-shaft, and which normally covers the perforations or mesh of the sieve or foraminous plate, being shown of abnormal dimensions to expose the said perforations. Fig. 4 is a detail perspective view of the agitator-shaft, its agitators, and attached sieve-covering plate; and Fig. 5 is a detached plan view of the foraminous bottom or sieve of the safe.

In accordance with my invention I employ a suitable upright receptacle A, preferably cylindric, which is provided with a foraminous concave bottom or sieve B and secured upon a box-like base or closure $a$, the lower end of said receptacle communicating with the chamber of said closure or base. The closure or base $a$ has a primary compartment or chamber $a'$, which is directly below the receptacle A, to receive the sifted flour, and which may hold the bread-pan and kneading-board when not in use. The closure $a$ also has at one side of the compartment or chamber $a'$ a much smaller compartment or chamber C, partitioned off from the former, as at $b$. The chamber $a'$ is provided with a drop-door D, being hinged at its lower edge to the base or closure $a$ at the lower front edge of the opening provided in one side of said closure for access thereto, and through which the sifted flour is removed from the closure. The door D is provided at its upper edge with a snap or spring bolt or other suitable fastening to secure the door when closed.

In the chamber C is a sliding drawer E, which is itself subdivided into compartments adapted to contain ingredients, as the yeast, salt, &c., for bread-making.

H is a shaft or axial rod bearing in the sides of the cylinder or receptacle A, as at $h$, near its sieve or foraminous bottom, said cylinder or receptacle being thickened or re-enforced thereat, as shown, re-enforcing the parts which are exposed to wear from the said shaft. The projecting end of the shaft or rod H is provided with a crank or handle $c$ for its rotation. This shaft is armed within the receptacle or cylinder A with a series of flexible strips or agitators F, preferably of steel, and which are semi-elliptic in shape and may be three (more or less) in number. These strips have their convexities presented outward from the shaft and in the lower arc of their movement are substantially parallel with and move closely to the concave foraminous bottom or sieve B, so that they agitate and loosen up the flour, causing it to readily pass or sift through said bottom or sieve and fall into the chamber of the closure $a$ below. These agitators or strips F converge at their ends and are preferably integral one with the other thereat and are received under and held upon the shaft H by collars or bands $f$, slipped upon said shaft inside of the receptacle or cylinder A, the latter thus serving to resist endwise displacement from the tension or pressure of said spring strips or agitators and to hold the collars or bands on the agitators or strips; also applied to the shaft H, opposite to the agitators F, is an imperforate concave plate G, which in practice is of sufficient width to cover the foraminous portion of the sieve or bottom B, said plate, when the agitators are at rest, being designed to stand directly over said portion of the bottom, and thus prevent the flour or contents of the cylinder or receptacle A from sifting through the latter at that time, especially as would be the case in moving the safe about from place to place or when jarred. The ends of this covering-plate G are narrowed or contracted to permit the slipping of the collars or bands ƒ also over them, holding said plate upon the shaft H. From this arrangement it will also be seen that the agitators, the shaft, and the plate G are readily assembled within the cylinder or receptacle A, and with equal facility taken apart for repair, renewal, or other purposes.

The device is simple, readily constructed, effective in operation, and convenient.

It will be understood that when through sifting a quantity of flour the plate G is caused to occupy the position seen in Figs. 2 and 3 for the purpose aforesaid.

Having thus fully described my invention, what I claim, and desire to secure by Letters Patent, is—

1. The flour-receptacle having the concave sieve, in combination with the shaft journaled in the receptacle and having the agitators and the sieve-covering plate on opposite sides, for the purpose set forth, substantially as described.

2. The flour-receptacle having the concave sieve, in combination with the crank-shaft journaled transversely in the receptacle, the spring semi-elliptic sieve-covering plate G, and agitators F, arranged on opposite sides of the said shaft and having their ends encompassing the same, and the collars or bands ƒ on the ends of the said agitators and sieve-covering plate and encircling the shaft and in contact with the bearings of the latter to prevent expansion of said agitators and sieve-covering plate, all arranged and adapted to operate substantially as described.

3. In a flour safe and sifter combined, the agitator-shaft having the sieve-covering plate, substantially as described.

4. In a flour safe and sifter combined, the shaft carrying a series of semi-elliptic flexible agitators and the concave sieve-covering plate having its ends, together with the ends of the said agitators, connected by collars or bands to said shaft, substantially as described.

In testimony whereof I affix my signature in presence of two witnesses.

CHARLES S. ROGERS.

Witnesses:
C. S. TERRY,
JOHN A. MACDONALD.